United States Patent [19]

Larson

[11] 4,307,219

[45] Dec. 22, 1981

[54] AQUEOUS SOLVENT DISPERSIBLE LINEAR POLYURETHANE RESINS

[75] Inventor: Wayne K. Larson, Maplewood, Minn.

[73] Assignee: Minnesota Mining and Manufacturing Company, Saint Paul, Minn.

[21] Appl. No.: 145,026

[22] Filed: Apr. 30, 1980

[51] Int. Cl.$^3$ .................. C08G 18/32; C08G 18/38; C08G 18/46

[52] U.S. Cl. .................. 528/71; 428/423.7; 525/440; 528/904

[58] Field of Search .................. 528/71, 904; 525/440

[56] References Cited

U.S. PATENT DOCUMENTS

| | | | |
|---|---|---|---|
| 3,479,310 | 11/1969 | Dieterich et al. | 260/18 TN |
| 3,905,929 | 9/1975 | Noll | 260/29.2 TN |
| 3,920,598 | 11/1975 | Reiff et al. | 260/29.2 TN |
| 4,028,313 | 6/1977 | Mueller et al. | 260/29.2 TN |
| 4,100,284 | 7/1978 | Cue | 424/250 |
| 4,108,814 | 8/1978 | Reiff et al. | 528/71 |
| 4,110,284 | 8/1978 | Violland et al. | 260/29.2 TN |
| 4,123,423 | 10/1978 | Wenzel et al. | 528/71 |
| 4,150,946 | 4/1979 | Neel et al. | 528/71 |
| 4,201,824 | 5/1980 | Violland et al. | 528/904 |

*Primary Examiner*—H. S. Cockeram
*Attorney, Agent, or Firm*—Cruzan Alexander; Donald M. Sell; Gerald F. Chernivec

[57] ABSTRACT

An organic polyurethane resin capable of water and aqueous organic solvent redispersibility comprising the reaction product of at least one hydrophilic diol, at least one hydrophobic diol, at least one organic diisocyanate and, optionally, at least one chain extender.

3 Claims, No Drawings

AQUEOUS SOLVENT DISPERSIBLE LINEAR POLYURETHANE RESINS

TECHNICAL FIELD

This invention relates to aqueous organic solvent-dispersible thermoplastic polyurethanes. The invention particularly relates to aqueous alcohol-dispersible polyurethanes having hydrophilic and hydrophobic segments.

BACKGROUND ART

It is, of course, well known to prepare organic thermoplastic polyurethanes by the reaction of organic diisocyanates with polymeric diols and diol chain extenders. It is also known to prepare water-dispersed polyurethane polymers. U.S. Pat. No. 3,479,310, for example, discloses water-dispersed plastics, which, as a latex, are suitable for the preparation of waterproof coatings. These plastics are prepared from polyhydroxy compounds, organic polyisocyantes, chain lengthening agents, if desired, and a sufficient amount of a component having an ionic salt-type group.

U.S. Pat. Nos. 3,905,929 and 3,920,598 disclose water-dispersible polyurethanes having side chain polyoxyethylene units, and U.S. Pat. Nos. 4,028,313 and 4,092,286 disclose water-dispersible polyurethanes having both an ionic salt-type group and side chain polyoxyethylene units.

However, even though aqueous compositions of dispersed polyurethanes are described, there is no teaching in any of these references of polyurethanes which are suitable for preparation of polyurethane coatings which can be subsequently dispersed by water or an aqueous organic solvent.

U.S. Pat. No. 4,110,284 discloses the preparation of ionic group-containing polyurethane latexes by the reaction of a hydrophilic polyester or polyether with an organic polyisocyanate. The patent does not disclose polyurethanes that can be coated onto a substrate and subsequently redispersed in water or aqueous organic solvents.

The linear polyurethanes of my invention can be used as protective coatings, primers, binders, etc.

DISCLOSURE OF INVENTION

In accordance with the invention, there are provided water and aqueous organic solvent redispersible thermoplastic organic polyurethane resins having excellent adhesion to substrates and a process for the production of such polyurethanes.

The polyurethanes of the invention have hydrophilic and hydrophobic segments and the general formula:

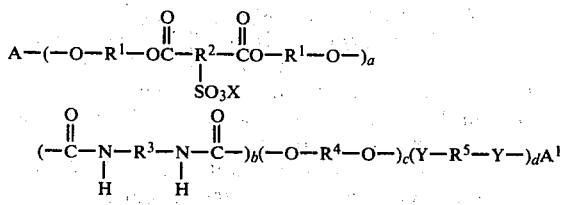

wherein $a$, $b$, $c$, and $d$ are numbers expressing the mole ratios of polyurethane hydrophilic, connecting, hydrophobic and chain extending segments within the respective parentheses in which $a$ is 1, $c$ is 0.1 to 20, $d$ is 0 to 20, and $b$ is $(a+c+d)$;

$A$ and $A^1$ are the same or different monovalent terminal groups;

$X$ is a cation selected from hydrogen, alkali metal, alkaline earth, and primary, secondary, tertiary and quaternary ammonium having 1 to 18 carbon atoms;

$R^1$ is the residue remaining after removal of terminal hydroxyl groups from one or more diols, HO—$R^1$—OH, said diols having a number average molecular weight between about 150 and 3500;

$R^2$ is an arenetryl group having 6 to 12 carbon atoms or an alkanetryl group having 2 to 12 carbon atoms;

$R^3$ is the residue remaining after removal of —NCO groups from diisocyanates, OCN—$R^3$—NCO, in which $R^3$ is arylene or alkarylene having 6 to 12 carbon atoms, alkylene having 2 to 12 carbon atoms, cycloalkylene having 5 to 12 carbon atoms, or divalent 5 or 6 atom-containing ring azacyclic groups having 3 to 10 carbon atoms and 1 to 3 —NCO groups;

$R^4$ is the residue remaining after removal of hydroxyl groups from one or more hydrophobic diols, HO—$R^4$—OH, having a molecular weight average of about 400 to 4000; $Y$ is —O—, —S—, or

in which $R^6$ is hydrogen or lower alkyl of from 1 to 4 carbon atoms; and $R^5$ is the residue remaining after the removal of terminal active hydrogen-containing groups from chain extender compounds having two Zerewitinoff hydrogens reactive with isocyanate groups and having a molecular weight of from about 18 to about 200;

with the proviso that the values of $a$, $b$, $c$, and $d$ are such that there is one —$SO_3X$ group per about 1000 to 8000 molecular weight of the polyurethane.

The redispersible polyurethane resins of the invention are prepared by reaction of hydrophilic diols, hydrophobic diols, diisocyanates, and, optionally, chain extenders.

DETAILED DESCRIPTION

Suitable hydrophilic diols for providing hydrophilic segments of the polyurethanes are bis-($\omega$-hydroxyaliphatic) esters of sulfo-substituted dicarboxylic acids. They are prepared by the esterification of a diol having a molecular weight of 150 to 3500, preferably between about 500 and 2000, with a dicarboxylic acid, lower alkyl ester, halide, or anhydride that has a sulfo group substitution. (By "sulfo group" is meant a —$SO_3X$ group in which X is hydrogen, an alkali metal cation, such as sodium, potassium, and lithium; an alkaline earth metal cation, such as magnesium, calcium, and barium; and primary, secondary, tertiary, and quaternary ammonium cations having one to 18 carbon atoms, such as ammonium, methylammonium, butylammonium, diethylammonium, triethylammonium, tetraethylammonium, and benzyltrimethylammonium. Preferably, X is monovalent.)

Suitable sulfo-substituted dicarboxylic acids for preparation of these hydrophilic diols include: sulfoalkanedicarboxylic acids such as sulfosuccinic acid, 2-sulfoglutaric acid, 3-sulfoglutaric acid and 2-sulfododecandioic acid; sulfoarenedicarboxylic acids such as 5-sulfoisophthalic acid, 2-sulfoterephthalic acid, 5-sulfonaphthalene-1,4-dicarboxylic acid; sulfobenzylmalonic acids such as those described in U.S. Pat. No. 3,821,281; and sulfofluorenedicarboxylic acids such as 9,9-di(2'-carboxyethyl)fluorene-2-sulfonic acid described in British Pat. No. 1,006,579. It is to be understood that the corresponding lower alkyl esters, halides, anhydrides, and salts of the above sulfonic acids can also be used in the preparation of the hydrophilic diol.

Diols suitable for condensation with the aforementioned sulfo-substituted dicarboxylic acid in preparing the hydrophilic diol are the polyoxyalkylene diols, polyesterdiols, and polylactonediols having a number average molecular weight of about 150 to 3500. Diols having a molecular weight less than about 150 do not confer sufficient organic character to the hydrophilic segment for it to be sufficiently soluble or compatible with other components for efficient reaction in the polyurethane preparation. Correspondingly, a molecular weight above about 3500 reduces the hydrophilizing action of the sulfo group causing reduced dispersibility of the polyurethane of the invention in aqueous solvents. Preferred diols have a molecular weight of from about 500 to about 2000.

Suitable diols also should be free of active hydrogens (other than the hydrogens present in the hydroxy groups) as can be determined by the method described by Zerewitinoff, J. Am. Chem. Soc. 49, 3183 (1927).

Exemplary diols include polyoxyalkylenediols, such as

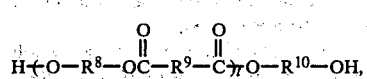

polyesterdiols, such as

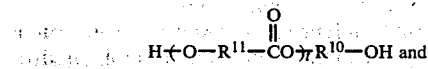

R$^6$ is alkylene of 2 to 4 carbon atoms,

R$^7$, R$^8$ and R$^{10}$ are the same or different alkylene or cycloalkylene having 2 to 12 carbon atoms, and up to 6 nonvicinal caternary oxygen atoms (i.e., oxygen atoms in the carbon chain backbone but not adjacent one to another), R$^9$ is alkylene or alkenylene having 2 to 12 carbon atoms and up to two nonvicinal oxygen atoms or cycloalkylene having 5 to 12 carbon atoms, R$^{11}$ is an alkylene chain of 2 to 12 carbon atoms that can be substituted by one to four alkyl groups each of from 1 to 4 carbon atoms, r is a number from 3 to 70, preferably 10 to 40, s is a number from 1 to 35, preferably 5 to 20, t is a number from 1 to 50, preferably 1 to 38, and u is a number from 1 to 25, preferably 1 to 10.

Further examples of polyoxyalkylenediols include polyoxyethylenediol, polyoxypropylenediol, and polyoxybutylenediol. Useful commercially available polyoxyalkylenediols include the polyoxytetramethylenediols available from Quaker Oats Company as "Polymeg" 650 and 1000; the polyoxyethylenediols available from Union Carbide as "Carbowax" 400 and 600; and the poly(oxyethylene-oxypropylene) glycols available as "Pluronics" from Union Carbide.

Polyesterdiols suitable for use in preparing the hydrophilic segment precursor diol and exemplified above are also well known in condensation polymer art. They are generally prepared by the condensation of one or more diols such as, for example, neopentyl glycol, propylene glycol, and dipropylene glycol with one or more dicarboxylic acids, such as, for example, succinic acid, butenedioic acid, adipic acid, maleic acid, glutaric acid, suberic acid, isophthalic acid, and 1,4-cyclohexane dicarboxylic acid. Other polyesterdiols are those obtained from the condensation of hydroxyalkanoic acids, such as, for example, 3-hydroxypropionic acid, 5-hydroxycaproic acid, and 12-hydroxydodecanoic acid.

Preferred polyesterdiols are those prepared by polymerizing one or more substituted or unsubstituted lactones, particularly caprolactone using a diol or dicarboxylic acid as an initiator as is described in U.S. Pat. Nos. 3,169,945 and 3,700,643. Suitable commercially available polyesterdiols for use in preparing the hydrophilic segment precursor diol include poly(ethyleneadipate)diols available from Mobay Chemical Company as "Multron" R series diols such as R-2, R-12A and R-16 and the aliphatic polyesterdiol "Paraplex U-148" available from Rohm and Haas. Particularly suitable commercial diols are the polycaprolactone diols available from Union Carbide as the "PCP" series diols such as "PCP" 0200 and 0230.

The hydrophilic polyol is prepared by an esterification reaction of a sulfo-substituted dicarboxylic acid or its lower alkyl ester, halide or anhydride with a diol as described above. The esterification reaction is carried out by heating the acid or derivative with about two mole equivalents of diol and about 0.5 to 5 percent by weight, based on the acid, of a catalyst such as toluenesulfonic acid, tertiary amines, titanium esters, and the like, as is well known in the esterification art. Generally, the mixture is heated to 150° to 250° C. and held at this temperature until the reaction is complete, generally less than about ten hours, as can be determined spectrometrically or by measurement of evolved alkanol (that is, when a lower alkyl ester of a sulfo-substituted dicarboxylic acid, the preferred derivative, is used). Preferably, the reaction is performed under an inert atmosphere, i.e., nitrogen. It is also desirable to employ a reduced pressure on the reactants during the last 5 to 30 minutes of the heating period.

Suitable diisocyanates for use as the connecting segment are any of the aliphatic, aromatic and heterocyclic diisocyanates known in the polyurethane field. Examples of preferred diisocyanates include 2,4-tolylene diisocyanate, 3,5,5-trimethyl-1-isocyanato-3-isocyanatomethylcyclohexane (also called isophorone diisocyanate and sold under the trademark "IPDI" by Veba-Chemie AG), methylene bis-(4-cyclohexylisocyanate) sold under the trademark "Hylene" WS by duPont, hexamethylene diisocyanate, and 1,3-di(isocyanatoethyl)hydantoin. Other suitable diisocyanates are described in U.S. Pat. Nos. 3,641,199; 3,700,643; and 3,931,117, among many others.

Hydrophobic diols from which the hydrophobic segments of the polyurethanes of the invention can be derived are in the same generic families of diols suitable for use in the hydrophilic diols of the invention with the exclusion of polyoxyethyleneglycols. Suitable hydrophobic diols should have a number average molecular weight of about 400 to 4000, and preferably from about 500 to about 2000. With decreasing molecular weights of the hydrophobic diol, the influence of the hydrophilic segment increases so that at molecular weights below about 400, the polyurethanes become water soluble. With increasing molecular weights, the influence of the hydrophilic segment decreases so that as molecular weights of the hydrophobic diol are increased above about 4000, the polyurethane becomes less and less dispersible in aqueous organic solvents.

Exemplary hydrophobic diols include polyoxyalkylenediols, such as

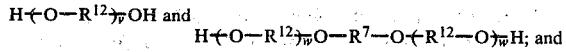

polyesterdiols, such as

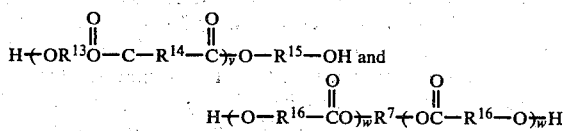

wherein $R^{12}$ is straight chain or branched alkylene of 3 or 4 carbon atoms, $R^7$ is as defined above, $R^{13}$, $R^{14}$, $R^{15}$ and $R^{16}$ are the same or different alkylene, alkenylene or cycloalkylene groups having 2 to 12 carbon atoms, v is a number having a value from 5 to 90, and w is a number having a value from 2.5 to 45.

Other desirable hydrophobic diols are the hydroxyl-terminated poly(haloalkyleneether)s (for brevity, called PECH diols) obtained by the reaction of one or more initiator diols with a haloaliphatic epoxide in the presence of a Lewis acid-type catalyst in accordance with methods such as are described in U.S. Pat. No. 2,581,464.

Hydrophobic diols are prepared by processes similar to those employed for the preparation of the hydrophilic diol with the exception that sulfo-substituted dicarboxylic acids are not employed and the use of a reaction catalyst is not always necessary.

Chain extenders that can be used in the linear redispersible polyurethanes of the invention are well known in the art and include any compound having two active hydrogen-containing groups and a molecular weight between 18 and about 200. Suitable compounds include water, diols, amines, bis(monoalkylamine) compounds, dihydrazides, dithiols, N-alkylaminoalkanols, hydroxyalkylthiols, hydroxyalkanoic acids, thioalkanoic acid and the like. Preferred chain extenders are the diols having the formula $HO(CH_2)_eOH$ in which e is 2 to 12, glycols of the formula $HO(CH_2CH_2O)_fH$ in which f is 1 to 6, glycols of the formula $HO[CH(CH_3)CH_2O]_gH$ in which g is 1 to 4, e.g., ethylene glycol, propylene glycol, diethylene glycol, diisopropylene glycol, and the like, 2,2-dimethyl-1,3-propanediol, 2,2-diethyl-1,3-propanediol, 3-methyl-1,5-pentanediol, 1,4-cyclohexanediol, 1,4-(dihydroxymethyl)cyclohexane and the like.

The nature of the terminal groups in the polyurethanes of the invention is relatively unimportant and certainly difficult to ascertain by analysis, there being only two such terminal groups per molecular weight of about 500 to 40,000 or more. It is postulated that where an excess of hydroxyl equivalency over isocyanate equivalency is used in the polyurethane, A in formula I is hydroxyl. Where an excess of isocyanate equivalency over hydroxyl equivalency is used, A is isocyanate. The presence of trace impurities having active hydrogens (i.e., a monohydric alcohol such as methanol would probably cause A to become methyl) would alter the isocyanate group depending on the nature of the impurity.

The redispersible polyurethane resins of my invention are prepared by the co-reaction of diisocyanate with hydrophilic diol, hydrophobic diol, and where used, chain-extenders under essentially anhydrous conditions. Components are maintained essentially anhydrous during their preparation or are dried as a first stage during their preparation by a suitable technique such as the distillation of a water azeotroping solvent, e.g., benzene or toluene.

The reaction can be carried out using a reactor equipped with agitator, means for heating and cooling, means for maintaining a dry atmosphere (flooding with dry nitrogen is satisfactory), means for adding components, and means for withdrawing reaction products.

Into the reactor is charged (on a molar basis) one mole of hydrophilic diol, about an equal weight of an inert organic solvent, e.g., methyl ethyl ketone, methyl isobutyl ketone, benzene, tetrahydrofuran, ethylenechloride or the like, and about 0.01 to 1 percent by weight of a urethane polymerization catalyst, such as stannous octoate. The mixture is agitated and heated to a temperature between 25° to 100° C., preferably between about 40° to 70° C. and then b moles of diisocyanate are added over a period of about 0.5 to 3 hours while maintaining the temperature, preferably, between about 40° to 70° C. The reactants are heated for about an additional hour after which c moles of hydrophobic diol are added. Heating is continued for about an hour and then, if it is to be used, d moles of chain-extending diol are added over a period of about 0.5 hours. Additional heat is then applied to raise the agitating contents to a temperature between about 75° to 100° C. (the refluxing temperature of the solvent). Heating at this temperature is continued until infrared spectrometric analysis of a sample of the reactants indicates depletion of isocyanate. The content of the reactor is then discharged from the reactor. The solution of aqueous organic solvent-dispersible polyurethane is then ready for use in various applications. Solvent can be removed, if desired, by drum drying or similar procedures known in the art or additional solvent and/or other adjuvants added in accordance with the particular use to be made of the polyurethane.

Adjuvants which can be added to the redispersible polymers of the invention to modify their characteristics include one or more of various materials such as plasticizers, dyes, pigments, organic and inorganic fillers, fire retardant agents, antioxidants, ultraviolet stabilizers, optical brighteners, and the like. Generally, depending on the desired modification, from about 1 to 50 percent by weight of the adjuvants can be added.

The redispersible polyurethanes are useful as protective coatings that can be readily removed by water or an aqueous solvent; as a primer for providing adhesion of a hydrophilic layer, e.g., a photographic emulsion, to a hydrophobic layer, e.g., a polyester film, etc.

The following non-limiting examples further and more specifically, illustrate the invention. Unless otherwise indicated, all parts are given by weight.

EXAMPLE 1

A. Preparation of a Hydrophilic Diol

Into a 1-liter, 3-necked flask were charged 148 grams (0.5 mole) of dry dimethyl 5-sodiumsulfoisophthalate, 530 grams (1.0 mole) PCP 0200, tradename for a polycaprolactonediol having a molecular weight of 530 commercially available from Union Carbide, and 1.48 grams triethylamine. The flask was fitted with a mechanical stirrer, a Woods metal heating bath, nitrogen purge equipment, distillation head, condenser and condensate collection flask, and vacuum source and control. While agitating the mixture and passing a slow nitrogen purge through the system, the temperature of the contents was raised to 200° C. over a period of about 20 minutes. To the hot mixture was then added 0.27 gram of tetraisopropyl titanate. As methanol distilled and collected in the collection flask, the temperature was raised to 240° C. and held for five hours after which time the theoretical amount of methanol had collected. The pressure in the flask was reduced to 20 Torr for ten minutes. The vacuum was then broken with dry nitrogen and the hydrophilic diol discharged from the reaction flask into a dry container which was sealed and the contents allowed to cool. The diol was a high viscosity liquid that crystallized on standing at 25° C. and had a melting point of 50° C.

Preparation of a Hydrophobic Diol

Into a 100 gallon reactor (about 378 liters) were charged 98.1 pounds(1 lb. mole)(44.5 kg) of maleic anhydride and 256 pounds (2 lb. moles) (116.1 kg) of 1,4-dihydroxymethylcyclohexane. The contents of the reactor were then heated to 220° C. during 1.25 hours and held at this temperature for 5.5 hours while agitating at 110 rpm and purging with dry nitrogen. There was then stirred into the mixture 60 grams of 2,6-di-tert-butyl-4-methylphenol and the contents discharged from the reactor. There were obtained 300 pounds (136.1 kg) of a hydrophobic diol having a hydroxyl equivalent weight of 240 and an acid number of 1.1.

C. Preparation of a Water-Redispersible Polyurethane

Into a 2-liter, 3-necked flask fitted with mechanical stirrer, oil heating bath, reflux condenser, charging funnel, and drying tube were charged 110 grams of the hydrophilic diol from Part A (0.1 mole) and 110 grams of tetrahydrofuran. While stirring the flask contents, there were then added dropwise over a period of 30 minutes 87 grams (0.5 moles) of toluenediisocyanate. The temperature of the mixture was raised to 70° C. and held for one hour. There was then added 0.05 gram of stannous octoate, and then over 30 minutes, a 50 percent by weight solution in tetrahydrofuran of 187.2 grams (0.39 mole) of the hydrophobic diol from Part B while maintaining the temperature at 70° C. The temperature was held at 70° C. for one hour after which 0.62 gram (0.01 mole) ethylene glycol was added. Heating was continued at 70° C. while agitating slowly (about 60 rpm). After two hours, 280 grams of tetrahydrofuran were added to reduce the concentration to 40 percent solids. After another two hours, 320 grams of tetrahydrofuran were added to reduce the solids concentration to 30 percent. Heating at 70° C. and stirring were continued for an additional 20 hours, after which the flask contents were discharged. The polyurethane obtained had an intrinsic viscosity of 0.36 in dimethylformamide and a glass transition temperature, $T_g$, of −2° C. The polymer was soluble in neither water nor isopropanol, but readily soluble in 40/60 isopropanol/water mixtures. Films cast from a 10 percent by weight solution of the polyurethane were tough and clear and could be redispersed in isopropanol/water.

EXAMPLE 2

Into a 1000 ml 3-necked round bottom flask, equipped with a stirrer, inert gas inlet, and reflux condenser, were charged 200 grams (0.1 mole) of a hydrophilic diol having a hydroxyl equivalent weight of 1000 that had been prepared as described in Part A of Example 1 and 200 grams of methyl isobutyl ketone. While stirring, the mixture was heated to about 100° C. to effect solution, cooled to 60° C., after which 87 grams (0.5 mole) of tolylene-2,4-diisocyanate were added in one portion. While stirring, the mixture was heated to 80° C. and held for 30 minutes, after which 85.2 grams (0.2 mole) of a hydrophobic diol, prepared as described in Part B of Example 1, were added. Stirring was continued at 80° C. for 30 minutes, after which 12.4 grams (0.2 mole) of ethylene glycol was added. The mixture was heated to reflux (115° C.) and stirred under these conditions for two to three hours. The chain-extended polyurethane obtained had an intrinsic viscosity of about 0.39 in dimethylformamide and a glass transition temperature of +9° C. Films cast from solutions of the polyurethane dried tough and clear and could be redispersed readily in isopropanol/water.

EXAMPLES 3–9

A series of hydrophilic diols were prepared in accordance with the procedure given in Part A of Example C using in place of PCP 0200 polycaprolactone, the reactants and amounts shown in Table I. The molecular weight measured for each of the hydrophilic diols obtained is given in the table.

TABLE I

| Ex. No. | Reactants (moles) | Hydrophilic Diol Molecular Weight |
|---|---|---|
| 3 | 1,6-Hexanediol (10) Dimethyl adipate (8) | 2136 |
| 4 | Polyoxyethylenediol[a] (2) [MW = 1500] | 3232 |
| 5 | 1,6-Hexanediol (6) Dimethyl adipate (4) | 1288 |
| 6 | Polycaprolactonediol[b] (2) [MW = 1250] | 2730 |
| 7 | Poly(neopentyl adipate)diol[c] (2) [MW = 1200] | 2700 |
| 8 | Poly(neopentyl adipate)diol[d] (2) [MW = 3130] | 6492 |
| 9 | Polycaprolactonediol[e] (2) [MW = 850] | 1932 |

[a]PEG 1500 commercially available from Union Carbide
[b]PCP 0230 commercially available from Union Carbide
[c]Lexorez 1400-90 commercially available from Inolax Corp.
[d]Lexorez 1400-35 commercially available from Inolax Corp.
[e]PCP 0210 commercially available from Union Carbide In the following Examples 10–15, aqueous organic solvent-redispersible polyurethanes were prepared in accordance with the general procedure given in Example 1 using the various component hydrophilic diols, hydrophobic diols, diisocyanates, and when used, chain-extenders listed.

EXAMPLE 10

32.4 grams (0.005 mole) of the hydrophilic diol of Example 8

5.3 grams (0.01 mole) PCP 0200 (polycaprolactone diol, MW 530)

3.33 grams (0.015 mole) isophoronediisocyanate

The polyurethane obtained had an intrinsic viscosity of 0.32 in dimethylformamide and a $T_g$ of $-32°$ C. Dried films were readily dispersed in isopropanol/water.

EXAMPLE 11

27.3 grams (0.01 mole) of the hydrophilic diol of Example 6

15.6 grams (0.005 mole) Lexorez 1400-35 [poly(neopentyl adipate), MW 3120] as the hydrophobic diol 1.06 gram (0.01 mole) diethyleneglycol 4.35 grams (0.025 mole) toluenediisocyanate The polyurethane obtained had an intrinsic viscosity of 0.39 in dimethylformamide, a $T_g$ of $-55°$ C., and a Tm of 41° C. Dried films were readily dispersed in 50 percent by volume isopropanol in water.

EXAMPLE 12

27.4 grams (0.02 mole) of the hydrophilic diol of Example 1

6.26 grams (0.002 mole) of Lexorez 1400-35 [poly(neopentyl adipate), MW 3120] as the hydrophobic diol 0.61 gram (0.01 mole) ethyleneglycol 5.6 grams (0.032 mole) toluenediisocyanate The polyurethane obtained had an intrinsic viscosity of 0.37 in dimethylformamide and a $T_g$ of $-28°$ C. Dried films were readily dispersed in 50 percent by volume isopropanol/water.

EXAMPLE 13

34.0 grams (0.025 mole) of the hydrophilic diol of Example 5

31.2 grams (0.05 mole) poly(epichlorohydrin)diol, MW 624

1.55 gram (0.025 mole) ethyleneglycol 17.4 grams (0.1 mole) toluene diisocyanate The polyurethane obtained had an intrinsic viscosity of 0.41 in dimethylformamide and a $T_g$ of $-3°$ C. Dried films were readily dispersed in 40/60 by volume isopropanol/water.

EXAMPLE 14

Example 13 was repeated using as a chain extender an equivalent amount of water in place of the ethyleneglycol. The polyurethane obtained had an intrinsic viscosity of 0.39 in dimethylformamide and a $T_g$ of $-7°$ C. Dried films were readily dispersed in 50 percent by volume isopropanol/water.

EXAMPLE 15

Example 13 was repeated using as a chain extender 2.9 g (0.025 mole) of 1,6-hexamethylenediamine. An intrinsic viscosity of 0.40 and a $T_g$ of $-42°$ C. were measured.

EXAMPLE 16

32.32 grams (0.01 mole) of the hydrophilic diol of Example 4

85.2 grams (0.2 mole) of the hydrophilic diol of Example 1B 6.2 grams (0.1 mole) of ethylene glycol 55.7 grams (0.32 mole) of toluenediisocyanate The polyurethane obtained had an intrinsic viscosity of 0.32 in dimethylformamide and a $T_g$ of 20° C. Dried films were readily dispersed in 50 percent by volume isopropanol/water.

EXAMPLE 17

27.2 grams (0.02 mole) of the hydrophilic diol of Example 1A 22.4 grams (0.04 mole) of the hydrophobic diol of Example 1B 0.62 grams (0.01 mole) ethylene glycol 12.2 grams (0.07 mole) toluenediisocyanate The polyurethane obtained had an intrinsic viscosity of 0.39 in dimethylformamide and a $T_g$ of $-18°$ C. Dried films were readily dispersed in 50 percent by volume isopropanol/water.

What is claimed is:

1. An organic polyurethane resin capable of water and aqueous organic solvent redispersibility having the general formula:

$$A-(-O-R^1-O\overset{O}{\underset{\|}{C}}-\underset{\underset{SO_3X}{|}}{R^2}-\overset{O}{\underset{\|}{C}}O-R^1-O-)_a$$

$$(-\overset{O}{\underset{\|}{C}}-\underset{\underset{H}{|}}{N}-R^3-\underset{\underset{H}{|}}{N}-\overset{O}{\underset{\|}{C}}-)_b(-O-R^4-O-)_c(Y-R^5-Y-)_dA^1$$

wherein a is 1, c is 0.1 to 20, d is 0 to 20, and b is the sum of a+c+d; a, b, c, and d being such that there is one —SO$_3$X group per about 1,000 to 8,000 molecular weight of the polyurethane;

A and A$^1$ are the same or different monovalent terminal groups;

X is a cation selected from hydrogen, alkali metal, alkaline earth, and primary, secondary, tertiary and quarternary ammonium having 1 to 18 carbon atoms;

R$^1$ is the residue remaining after removal of terminal hydroxyl groups from one or more diols, said diols having a number average molecular weight between about 150 and about 3,500;

R$^2$ selected from an arenetryl group having 6 to 12 carbon atoms and an alkanetryl group having 2 to 12 carbon atoms;

R$^3$ is the residue remaining after removal of —NCO groups from diisocyanates, wherein R$^3$ is selected from arylene or alkarylene having 6 to 12 carbon atoms, alkylene having 2 to 12 carbon atoms, cycloalkylene having 5 to 12 carbon atoms, or divalent 5 or 6 atom-containing ring azacyclic groups having 3 to 10 carbon atoms and 1 to 3 —NCO groups;

R$_4$ is the residue remaining after removal of hydroxyl groups groups from one or more hydrophobic diols having a molecular weight average of about 400 to about 4,000;

Y is —O—, —S—, or $$-\underset{\underset{R^6}{|}}{N}-,$$

in which R$^6$ is hydrogen or lower alkyl of from 1 to 4 carbon atoms;

R$^5$ is the residue remaining after the removal of terminal active hydrogen-containing groups from chain extender compounds having two Zerewitinoff hydrogens reactive with isocyanate groups and having a molecular weight of from about 18 to about 200.

2. The polyurethane resin of claim 1 wherein said hydrophilic diol is a bis($\omega$-hydroxy-aliphatic) ester of a sulfo-substituted dicarboxylic acid.

3. The polyurethane resin of claim 1 wherein said reaction product further includes at least one chain extender compound having a molecular weight between about 18 and about 200.

* * * * *